(12) United States Patent
Lyren et al.

(10) Patent No.: US 12,066,851 B2
(45) Date of Patent: *Aug. 20, 2024

(54) APPLIANCE LOAD MANAGER THAT CYCLES AN AIR CONDITIONER TO REDUCE PEAK DEMAND

(71) Applicants: Philip Scott Lyren, Rincon, PR (US); William James Lyren, Wadsworth, OH (US); William Christopher Lyren, Wadsworth, OH (US)

(72) Inventors: Philip Scott Lyren, Rincon, PR (US); William James Lyren, Wadsworth, OH (US); William Christopher Lyren, Wadsworth, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,111

(22) Filed: Apr. 7, 2023

(65) Prior Publication Data
US 2023/0273636 A1    Aug. 31, 2023

Related U.S. Application Data

(63) Continuation of application No. 17/694,814, filed on Mar. 15, 2022, now Pat. No. 11,625,059, which is a continuation of application No. 16/792,281, filed on Feb. 16, 2020, now Pat. No. 11,289,909, which is a continuation of application No. 15/940,990, filed on Mar. 30, 2018, now Pat. No. 10,566,794, which is a continuation of application No. 14/613,389, filed on Feb. 4, 2015, now Pat. No. 9,948,102, which is a continuation of application No. 14/022,352, filed on Sep. 10, 2013, now Pat. No. 8,954,199, which is a continuation of application No. 13/274,305, filed on Oct. 15, 2011, now Pat. No. 8,538,595.

(51) Int. Cl.
*G05F 1/66* (2006.01)
*G05B 13/02* (2006.01)
*G06Q 50/06* (2012.01)
*H02J 3/14* (2006.01)

(52) U.S. Cl.
CPC ............. *G05F 1/66* (2013.01); *G05B 13/026* (2013.01); *G06Q 50/06* (2013.01); *H02J 3/14* (2013.01); *H02J 2310/14* (2020.01); *Y02B 70/30* (2013.01); *Y02B 70/3225* (2013.01); *Y04S 20/222* (2013.01); *Y04S 20/242* (2013.01)

(58) Field of Classification Search
CPC ........ G05F 1/66; G05B 13/026; G06Q 50/06; H02J 3/14; H02J 2310/14; Y02B 70/30; Y02B 70/3225; Y02B 90/20; Y04S 20/222; Y04S 20/242; Y04S 20/00; Y04S 20/244

See application file for complete search history.

(56) References Cited

U.S. PATENT DOCUMENTS

| | | | | |
|---|---|---|---|---|
| 2005/0005621 A1* | 1/2005 | Jayadev | ............. | G05D 23/1923 236/46 R |
| 2009/0248217 A1* | 10/2009 | Verfuerth | ............... | H05B 47/11 700/295 |
| 2010/0179708 A1* | 7/2010 | Watson | ............. | H02J 13/00017 700/296 |

FOREIGN PATENT DOCUMENTS

JP    H09215193 A  *  8/1997

* cited by examiner

*Primary Examiner* — Kidest Bahta

(57) ABSTRACT

A home appliance can operate in a future time frame. Information is obtained from a power distributor in order to determine a time when to operate the home appliance in this future time frame. The home appliance then operates at the time determined with information from the power distributor.

20 Claims, 4 Drawing Sheets

APPLIANCE LOAD MANAGER THAT CYCLES AN AIR CONDITIONER TO REDUCE PEAK DEMAND

BACKGROUND

Power distributors transmit and sell electrical power to residential and commercial customers. The power distributors often buy this power on the open market and then resell the power to their customers.

One challenge is that power distributors do not know in advance an amount of power that their customers will request. If an unexpected large number of customers request power during a same time period, then the power distributor can have a power demand spike. Such spikes can lead to brownouts, outages, and higher energy costs to the customers.

SUMMARY OF THE INVENTION

One embodiment is a home appliance that includes a memory storing instructions and a processing unit that executes the instructions to store operating information over a time period, analyze the operating information to determine a future time frame when the home appliance can operate, communicate the future time frame to a power distributor that provides electrical power to the home appliance, receive from the power distributor a time to operate the home appliance during the future time period, and operate the home appliance at the time received from the power distributor and with the electrical power received from the power distributor.

DETAILED DESCRIPTION

Example embodiments manage power distribution to residential and commercial customers to reduce peak demand and more evenly distribute power throughout the day and night.

In one example embodiment, electrical devices include an Intelligent Appliance Load Manager (IALM) that stores operating information and communicates with a power distributor to determine a time to operate the electrical device.

In one example embodiment, customers have a Local Area Network (LAN) or Home Area Network (HAN) that includes an Intelligent Electrical Load Manager (IELM) that provides power requests to a power distributor. The power requests are provided to the power distributor before the power is actually used (for example, the requests are provided minutes, hours, or days before the power is consumed). The power requests include an amount of power being requested and time frames for using the power being requested (for example, the power requests asks for 2.5 kilowatt hours to be used during a 30 minute duration between the hours of 12:00 a.m. to 8:00 a.m.). The power distributor receives these power requests from many IELMs in advance of the power being used and then uses information in these requests to manage power distribution to the requesting customers. For example, the power distributor can instruct the IELMs when to turn on and off the electrical devices in order to purchase electricity at a lower rate or reduce demand spikes. Customers can also form groups to collectively bid on power and/or provide power requests for the group to the power distributor before the power is actually used.

Figure 1:
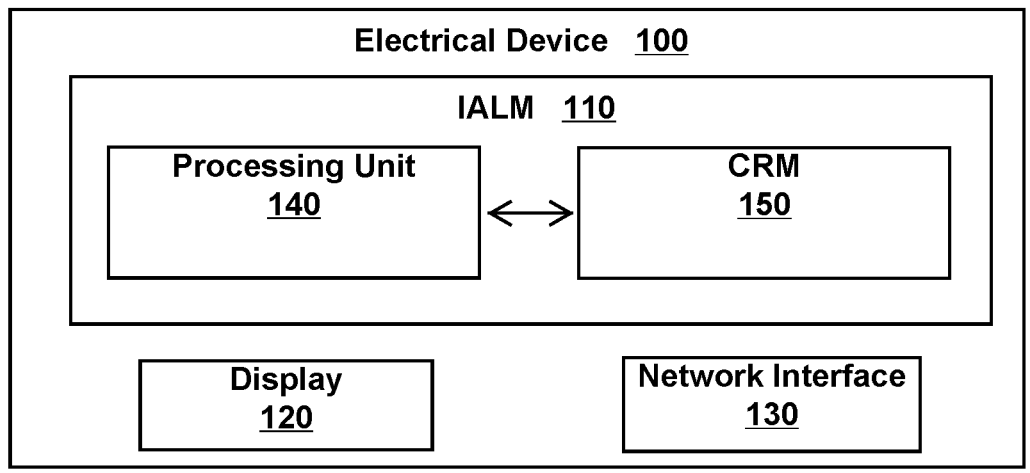
FIG. 1 is an electrical device in accordance with an example embodiment.

FIG. 1 shows an electrical device 100 in accordance with an example embodiment. The type of electrical device can vary widely and includes, but is not limited to, electrical appliances, home appliances, air conditioners, refrigeration units, heating units, automobile charging devices, fans, furnaces/heaters, and other residential, commercial, and industrial devices that use electricity.

As used herein, a home appliance is an electrical device that accomplishes a household function, such as cooking, cleaning, cooling, and/or heating. Home appliances include, but are not limited to, major appliances (such as air conditioners, dishwashers, clothes dryers, drying cabinets, freezers, refrigerators, kitchen stoves, water heaters, washing machines, trash compactors, microwave ovens, and induction cookers) and small appliances (such as DVD players, cameras, radios, televisions, etc.).

The electrical device 100 includes an intelligent appliance load manager (IALM) 110, a display 120, and a network interface 130.

The display 120 includes a user interface (such as a graphical user interface, GUI) that enables a user to provide input to the electrical device and to view output.

The network interface 130 provides a mechanism for the electrical device 100 to communicate with other electrical devices, computers, or systems. For example, the network interface 130 enables the electrical device to transmit data through a wired or wireless connection to a network, such as a HAN, the Internet, and/or a cellular network.

The IALM 110 includes a processing unit 140 in communication with and/or coupled to a computer readable medium (CRM) 150. By way of example, the processing unit 140 can be a processor, a microprocessor, central processing unit (CPU), or application-specific integrated circuit (ASIC) for controlling and/or receiving instructions or data from the CRM 150 (such as random access memory (RAM) for temporary data storage, read only memory (ROM) for permanent data storage, and/or firmware).

Example embodiments apply to different types of electrical devices. For example, residential and commercial customers have electrical appliances and other power-consuming electrical devices that have different requirements with respect to power-usage over time. Some electrical devices continuously require power over time (such as a fan or clock that continuously operates), and other electrical devices randomly require power when turned on and off by a user (such as a television or light in a residential home). As yet another example, some electrical devices use a known or predetermined amount of power, and the use of this power does not have to occur at an exact time but can occur during a range of time (as used herein, these latter devices being called Variable Time-Based Load Devices, VTLDs).

VTLDs include electrical devices that run for a known period of time but can be turned on at different times such that the exact time at which the electrical device is turned on is not crucial as long as the electrical device operates during a time period. VTLDs also include electrical devices that utilize a known amount of power during a time period, but use of this power can occur anytime during a time period that is larger than the time period to use the power. By way of example, a VTLD can be a washing machine, clothes dryer, dishwasher, or other electrical device or appliance that is not required to run at a specific time or on demand, but can run anytime during a time range. By way of illustration, consider a dishwasher that is programmed to run anytime during the night (for instance, the customer desires the dishwasher to run while the customer is asleep). If the dishwasher is set to a predetermined cycle (such as being designated to run an energy saving cycle to wash the dishes), then both the amount of power drawn and the amount of time to draw this power are known in advance. A customer may request that the dishwasher run during the night (e.g., between 9:00 p.m. and 6:00 a.m.), but the exact time that the dishwasher starts during this time period is not crucial, as long as the dishwasher starts and finishes execution during the time period. A dishwasher that runs at night in this fashion would be an example of a VTLD. With VTLDs, the time at which the device executes the requested function is not crucial as long as the device executes during a specified time frame.

One way to implement example embodiments is for a customer to indicate which electrical devices are VTLDs. This indication can be made to the electrical device through the display 120. For example, a user interacts with the display to navigate menu options or provides a command to indicate that the electrical device is a VTLD. Alternatively, this indication can be made to the electrical device through the network interface 130. For example, a user uses a personal computer (PC) to communicate with the electrical device 100 through the network interface 130 in a HAN.

The user can also utilize the display 120 and/or network interface 130 to operate the electrical device 100 and provide instructions for operation. By way of example, if the electrical device is a dishwasher, the user can instruct the dishwasher to run a wash and rinse cycle anytime between 9:00 p.m. and 6:00 a.m. The dishwasher would then communicate this information to the power distributor, and the power distributor would indicate to the dishwasher what time to turn on and execute the wash and rinse cycle. The information communicated to the power distributor would be sufficient so the power distributor would know in advance an amount of power being requested, a duration of time to use the requested power, and a time range for when the requested power can be used.

In one example embodiment, the user or customer indicates which electrical devices are VTLDs. This indication can be made for different electrical devices, such as dishwashers, washing machines, clothes dryers, air conditioners, battery chargers, air conditioners, electrical appliances, etc. The user or customer can also indicate execution times or run times for each of the electrical devices. For example, the customer would indicate the dishwasher is a VTLD with a run period between 12:00 a.m. to 6:00 a.m. In other words, the customer desires to have the dishwasher run anytime between the hours of midnight and six o'clock in the morning.

In one example embodiment, these indications are not provided by the customer, but are automatically determined by the electrical device. The electrical device itself or an IELM determines whether the electrical device is a VTLD and determines when to turn on and off based on the communications with the power distributor and operating information. In this way, the customer is not burdened with indicating which devices are VTLDs and what time periods are required for operation. By way of example, the IALM of an electrical device or an IELM monitors operating information of the electrical device over a time period. The IALM or IELM determines that the electrical device can be designated as a VTLD. Once this determination is made, the electrical device or IELM would inform the customer that the electrical device could be designated as a VTLD. The customer could accept or reject this designation. The customer could also be provided with cost savings information on purchasing electricity in order to assist in making an informed decision as to whether to accept or reject the designation of the electrical device as a VTLD.

Figure 2:
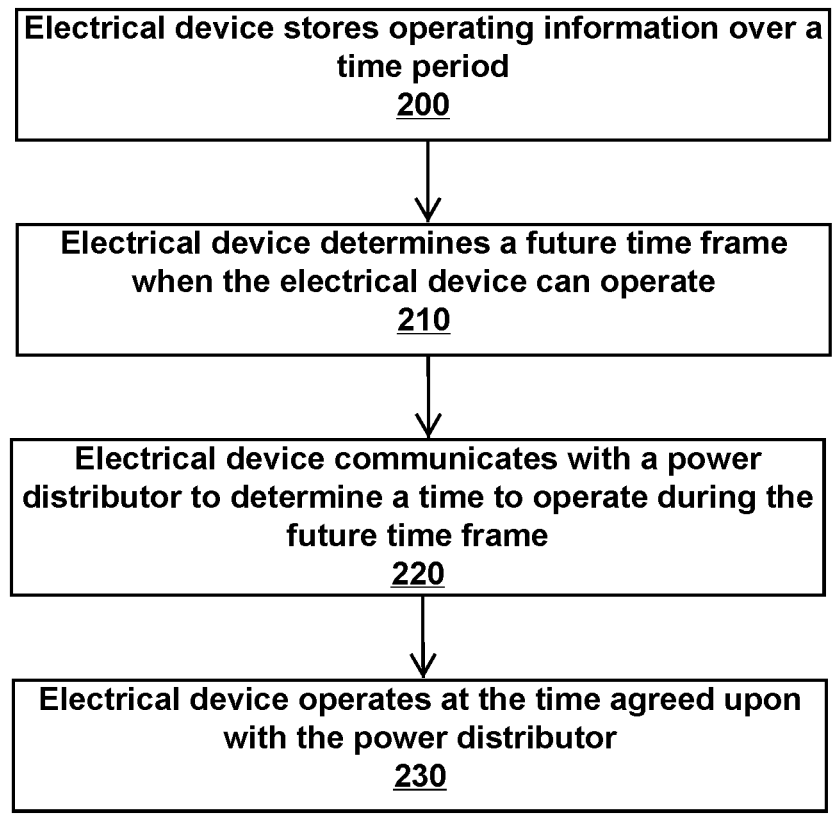
FIG. 2 is a method executed by an electrical device to determine an operating time in accordance with an example embodiment.

FIG. 2 is a method executed by an electrical device to determine an operating time in accordance with an example embodiment.

According to block 200, the electrical device stores operating information over a time period. This operating information includes, but is not limited to, what calendar dates and times of day that the electrical device is used, how long the device operates at these dates and times, and how many kilowatt hours are used at these dates and times. The electrical device can track and store this historical information for a designated time (such as days, weeks, months, years) or for the lifetime of the electrical device.

According to block 210, based on the operating information, the electrical device determines a future time frame (i.e., a time frame that has not yet occurred but will occur at a future time) when the electrical device can operate. The electrical device analyzes the historical data from the operating information to determine future operating times (such as when to turn on and off and/or when to operate) and power load requirements.

In one embodiment, the time frame is a calendar date and a range of time on this date that the electrical device can operate in the future. This range of time is based on an analysis of the historical operating information. The time frame can be based on a prediction or probability that the electrical device will operate at a certain time or during a certain time period in the future. For example, if the current date and time were May $17^{th}$ at 11:00 a.m., then the electrical device could predict (based on historical operating times) that the electrical device will be operated on May $17^{th}$ (i.e., the same day) between 4:00 p.m. and 7:00 p.m. The electrical device could then pre-order power to operate the electrical device before electrical device actually uses this power.

The electrical device can utilize one or more statistical methods to calculate a probability of the electrical device being used during a certain time frame in the future or certain time range based on the historical data of when the electrical device was previously used. By way of example, the operating times and power usages can be plotted. The mean and standard deviation of the distribution can be calculated to find a measure of confidence or confidence interval. The distribution can also be used to calculate a variance and determine a likelihood of the electrical device being used during a certain time period (for example, the electrical device has a 95% chance of being used between the hours of 1:00 p.m. to 4:00 p.m.).

According to block 220, the electrical device communicates with a power distributor to determine a time to operate during the future time frame. For example, the electrical device provides the power distributor with operating information that includes one or more of a future time and/or date when the electrical device desires to operate, a time frame on this date for when the electrical device desires to operate, a length of time of operation during the time frame, an amount of power desired for usage during the length of time of operation, a make and/or model of the electrical device (or other information to identify the type of electrical device), an address and/or location of the electrical device, and an identification of a customer associated with the electrical device. Based on this information, the power distributor instructs the electrical device when to operate during the requested time frame.

The power distributor receives the calendar date and time frame from the electrical device and/or customer and then selects a time for the electrical device to operate within this time frame. For example, the electrical device might identify itself and instruct the power distributor as follows: "Requesting 1.5 kWh of power during a one hour time period anytime between 8:00 a.m. to 4:00 p.m. on May $17^{th}$." In response to this request, the power distributor might respond to the electrical device as follows: "Commence usage of the requested 1.5 kWh at 1:00 p.m. on May $17^{th}$."

In one embodiment, the electrical device and/or customer purchases power to operate the electrical device from the power distributor before the electrical device uses the power during the future time frame.

The electrical device can communicate with the power distributor directly, such as providing the operating information to the power distributor through one or more networks. The electrical device can also negotiate with the power distributor for a price to buy the requested electrical power to operate the electrical device during the future time frame. This negotiation could include the electrical device offering to operate at one of a plurality of different times in the future in order to purchase electricity at a lower cost during one of these different future times.

Alternatively, the operating information can be provided to the power distributor from another device. For instance, the electrical device communicates the operating information to another device (such as a personal computer, an electric meter, an Intelligent Electrical Load Manager (IELM), etc.), and this other device provides the information to the power distributor.

According to block 230, the electrical device operates at the time agreed upon with the power distributor. For example, the power distributor instructs the electrical device to turn on and off and/or execute at a specific time and date. This specific time and date would be within the time frame calculated by the electrical device and communicated to the power distributor. The electrical device would then execute at the designated time and date for the requested duration and utilize the requested or known amount of power.

Consider the following example of a customer who purchases a new dishwasher with an IALM. Over a period of days, weeks, or months, the IALM in the dishwasher tracks when the dishwasher is used, how long the runtimes are for each use, and how many kilowatt hours are used for each runtime. The IALM determines that there is a 90% likelihood that each evening between 8:00 p.m. to 9:00 p.m., the customer starts the dishwasher and runs it for a cycle of 60 minutes that consumes 30.0 kilowatt hours of electricity. The dishwasher door is not opened until 6:00 a.m. to 7:00 a.m. the next morning. With this information, the IALM automatically designates the dishwasher as VTLD. The next night, the customer loads the dishwasher and turns on a wash and rinse cycle at 8:00 p.m. The dishwasher, however, does not start at this time. Instead, the IALM of the dishwasher reports a request to the power distributor of the customer for 30.0 kilowatt hours between 8:00 p.m. to 6:00 a.m. with a runtime of one hour. The power distributor determines an optimal time for distributing the 30.0 kilowatt hours and instructs the dishwasher when to execute the wash and rinse cycle. For example, the power distributor might determine that the lowest demand for electricity occurs at 3:30 a.m. This time could also represent a lowest cost to purchase power during the requested runtime of 8:00 p.m. to 6:00 a.m. The power distributor would then instruct the dishwasher to turn on and execute at 3:30 a.m. until 4:30 a.m.

When the customer turns on the dishwasher, the dishwasher would not immediately start. A light or other indication (such as a message on a display of the dishwasher or an audible indication) can indicate to the customer that the dishwasher will not run immediately, but instead run during a time frame. This indication would instruct the customer that the dishwasher will communicate operating information with the power distributor to determine a time to operate so the dishwasher can purchase power at a lower rate. The customer will save money since the dishwasher will be run at a later time when the purchase of power is less expensive.

Consider another example in which a customer has an electric vehicle, such as an automobile that uses electricity to move. Each evening at approximately 5:00 p.m., the customer drives home, parks the automobile in a garage, and plugs the automobile into an automobile recharging unit. This unit then charges the batteries of the automobile for approximately 3 hours. Each morning at approximately 6:00 a.m., the customer unplugs the automobile recharging unit. The IELM of the customer monitors this charging of the automobile and determines that automobile recharging unit is a VTLD. The next evening when the customer plugs the automobile into the automobile recharging unit at 5:00 p.m., the IELM contacts the power distributor and requests rates for power to charge the automobile between 5:00 p.m. and 6:00 a.m. The IELM would commence charging of the automobile at a time when the rate for electricity was the lowest during this time period.

Figure 3:
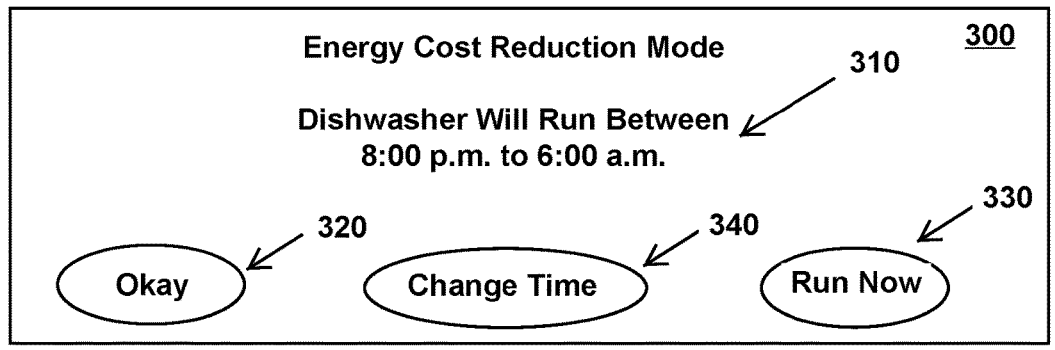
FIG. 3 is a display of an electrical device in accordance with an example embodiment.

By way of example, FIG. 3 shows a display 300 of an electrical device. For illustration, the display is on a dishwasher, but the display can occur on other electrical devices in accordance with example embodiments.

The display 300 indicates that the dishwasher is in an Energy Cost Reduction Mode. This mode indicates to the customer that the electrical device will start and stop during a time period in order to purchase and/or receive electricity at a reduced rate from the power distributor. By way of illustration, the display 300 indicates information 310 of its intended operation times, such as displaying that the "Dishwasher will run between 8:00 p.m. to 6:00 a.m." Information 310 instructs the customer that the dishwasher will delay execution of the requested run cycle and execute its requested run cycle during this future time period.

The display 300 further includes options for the customer to accept, reject, or change the proposed operation times. For example, assume the customer loads and starts the dishwasher at 8:00 p.m. The dishwasher does not immediately start, but instead displays the information shown in FIG. 3.

If the user presses or touches "Okay" at 320, then the dishwasher will communicate with the power distributor and execute between 8:00 p.m. to 6:00 a.m. If the user presses or touches "Run Now" at 330, then the dishwasher will immediately execute (as opposed to communicating and/or negotiating with the power distributor to determine a time to operate having a lowest cost for electricity). If the user presses or touches "Change Time" at 340, then the user can change the time frame of operating the dishwasher. For example, the user can further interact with the display to change the time frame from 8:00 p.m. to 6:00 a.m. to 8:00 p.m. to 4:00 a.m. The dishwasher would then communicate with the power distributor and determine a time to operate between 8:00 p.m. to 4:00 a.m.

When the user starts the electrical device, the user can indicate a time frame for the electrical device to execute. The user can interact with the display and instruct the electrical device when to start and/or when to finish. For example, assume that the electrical device is a clothes washing machine. After loading the clothes, the user instructs the washing machine to run anytime as long as the washing machine finishes before a specified time. By way of example, the user instructs the washing machine to finish washing the clothes anytime within the next 5 hours or to finish washing the clothes before 6:00 p.m. on the next day. The washing machine is thus provided with a time frame in which to complete the requested task of washing the clothes. Since this time frame is greater than the time needed to complete the task, the washing machine can select when in time to start to wash the clothes. The washing machine would then communicate with the power distributor in order to select an optimal time to start washing the clothes. The washing machine would provide the power distributor with operating information (such as power requirements, time duration, etc.) and ask for a start time in order to receive a reduced price for electricity. For instance, if the washing machine were planning to run a one-hour wash cycle and consume 500 watts of electricity anytime during the next 10 hours, then the washing machine would identify itself to the power distributor, communicate this information, and request a start time. The power distributor would then instruct the washing machine when to start in order to receive a lowest price for electricity (for instance, if the request were received at noon, the power distributor might instruct the washing machine to start at 3:00 p.m.).

When the scheduled operation time or scheduled power usage agreement with the power distributor is violated by the electrical device, the electrical device can take an action, such as automatically shutting down, notifying a user, performing a predetermined operation (such as converting to a default mode), etc. The user can also interact with the electrical device to override these actions. Consider an example in which the user schedules the electrical device to turn on and operate at 3:00 p.m. The electrical device subsequently determines that power for the scheduled operation can be purchased much cheaper if the device operates at 5:00 p.m. instead of 3:00 p.m. The electrical device could change the scheduled operation time but notify the user in advance of changing the operation, such as sending a text message or email to the user. The user could accept this change or reject it and instruct the electrical device to perform the operation at 3:00 p.m.

The electrical device can also notify the user of the cost implications of making a schedule change, such as providing the user with an amount of money being saved or lost by switching to a different operating time. The electrical device can also provide the user with a cost comparison of different operating times. For example, the electrical device communicates with the power distributor, determines different costs for buying electricity at different times, and then communicates these costs to the user. The user and/or electrical device can then make an informed decision based on the cost of electricity when to operate the electrical device in the future.

Figure 4:
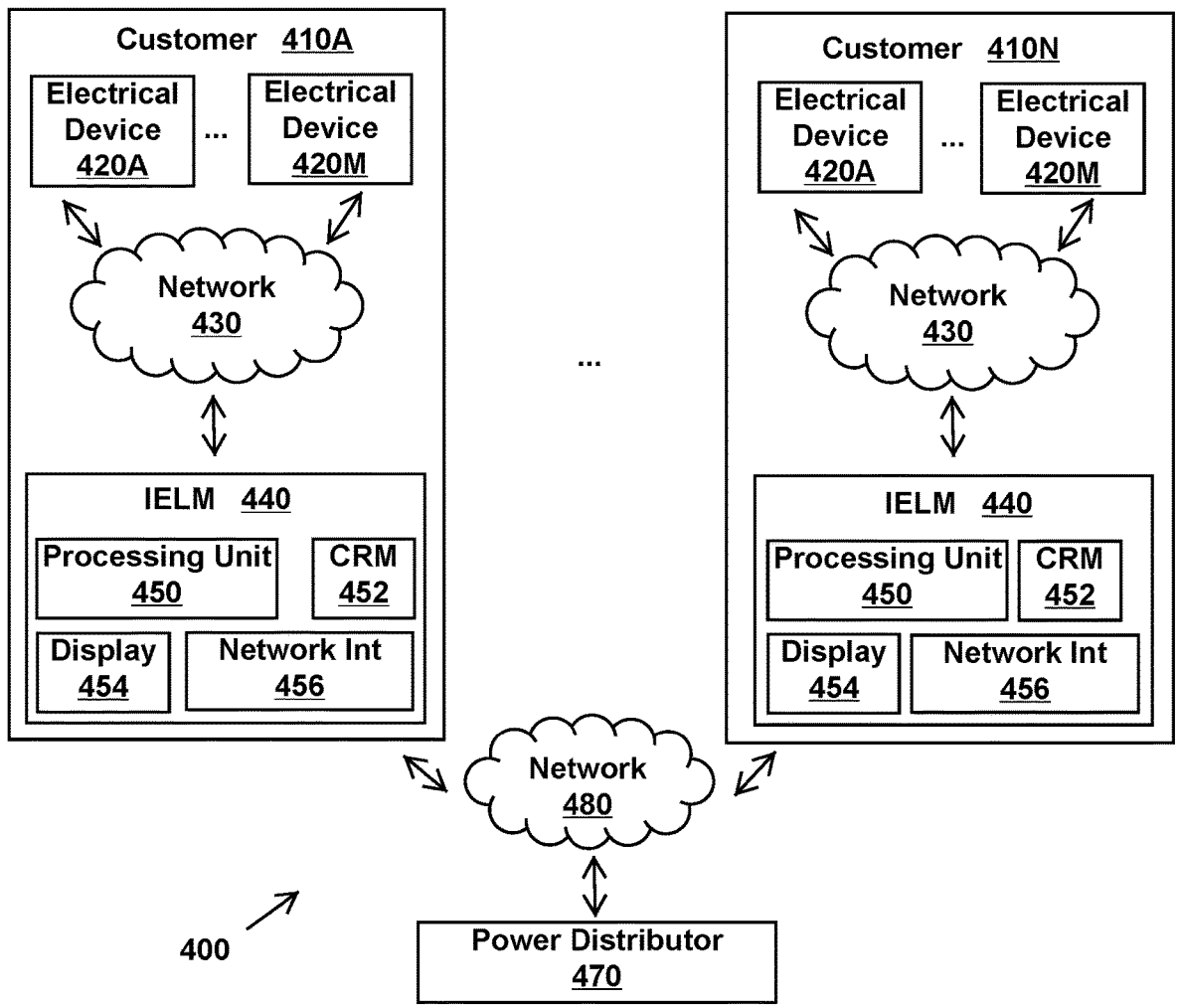
FIG. 4 is a system that manages power distribution to electrical devices in accordance with an example embodiment.

FIG. 4 shows a system 400 that manages power distribution to electrical devices in accordance with an example embodiment. The system 400 includes a power distribution system that distributes electricity from a power supplier or power generator to customers. For example, electricity flows along transmission lines from a generating station (such as a power plant) to substations, and then flows from the substations through distribution lines to the customers. By way of further example, the system 400 includes a smart grid system.

The system 400 includes a plurality of residential and/or commercial customers 410A to 410N. Each customer includes one or more electrical devices 420A to 420M that consume electricity. By way of example, these electrical devices include one or more of VTLDs, the electrical device 100 shown in FIG. 1, and other electrical devices and appliances.

Each customer 410A to 410N includes a network 430 and an Intelligent Electrical Load Manager (IELM) 440. The IELM has a processing unit 450, a CRM 452, a display 454, and a network interface 456. The electrical devices 420A to 420M communicate with the IELM 400 through the network 430.

The system 400 also includes a power distributor 470 and a network 480. Each customer 410A to 410N can communicate with the power distributor 470 through the network 480. For example, each electrical device 420A to 420M communicates with the IELM 440 of each customer, and then each IELM can directly communicate with the power distributor 470. As another example, each electrical device 420A to 420M can directly communicate with the power distributor 470.

As used herein, a network can include one or more of the internet, an intranet, an extranet, a cellular network, a local area network (LAN), a home area network (HAN), metropolitan area network (MAN), a wide area network (WAN), etc.

As used herein, a power distributor is an entity that performs one or more of generating, distributing, providing, or selling electricity to customers, such as residential, commercial, or industrial customers. Power distributors include, but are not limited to, cities, villages, towns, municipalities, political subdivisions of a state, electric utilities, and other entities that engage in the generation, transmission, and/or distribution of electricity for sale to customers. Power distributors also include groups, such a group of municipalities that aggregate their power requirements and purchase power from an entity that generates power.

The system 400 manages electrical devices 420A to 420M in order to reduce peak demand or random spikes in demand for electricity that is provided by the power distributor 470. The power distributor receives power requests from these electrical devices and then regulates when in time these electrical devices turn on and off and/or when in time these electrical devices utilize the power being requested and provided by the power distributor. This process provides the power distributor with requests for power in advance of the requested power being supplied to the customer. This process thus enables the power distributor to more evenly distribute load throughout the day and evening and reduce peak demand. The power distributor knows in advance a time range when each electrical device is to be run, power usage of each electrical device, and a length of time that the device will run. This process also provides the power distributor with information to more accurately predict or forecast an amount of power that will be used in the future at certain times of day.

By way of example, assume the system 400 forms part of a city and the power distributor 470 supplies electrical power to residential and commercial customers 410A to 410N in this city. The power distributor receives power requests each day from these customers for their respective electrical devices, such as their VTLDs. The power distributor would then know in advance how much power will to be distributed over a future time period for these electrical devices. The total power to be distributed during this time period can be more evenly distributed to reduce or eliminate peak demand or spikes in demand. For example, if peak demand occurred at 6:00 p.m., then the power distributor could instruct the electrical devices to utilize their requested power before or after 6:00 p.m. The power distributor can thus use the power requests to reduce costs associated with power purchasing and distribution and then pass this savings to the customers, such as lower peak demand charges and/or lower kilowatt hour charges.

As discussed in connection with FIG. 2, the electrical device can track and store historical operating information to determine a time frame for when the electrical device can operate. This operating information can be communicated to the power distributor to determine a time to operate. Alternatively, the IELM can manage power distribution to the electrical devices.

In one example embodiment, the IELM 440 tracks and stores operating information over a time period for the electrical devices 420A to 420M. Based on this operating information, the IELM calculates a future time frame for when the electrical devices can operate and communicates this information to the power distributor in order to determine when in time to turn on and off the electrical devices.

By way of example, a customer has three electrical devices (such as VTLD #1, VTLD #2, and VTLD #3). The IELM tracks historic power usages over time for each of these electrical devices and calculates probabilities that these devices will be used during certain time ranges. A user turns on VTLD #1 at 8:30 a.m. with a run cycle of one hour that will consume 1.0 kWh. The IELM calculates a 93% probability that VTLD #1 can execute this run cycle anytime between 8:30 a.m. and 3:30 p.m. Based on this probability, the IELM instructs VTLD #1 not to immediately execute this run cycle. The IELM then communicates with the power distributor and requests whether the power distributor is offering a rebate for electricity of 1.0 kWh at anytime between 8:30 a.m. to 3:30 p.m. If the power distributor is not offering any rebate or reduced price for this amount of electricity, then the IELM instructs VTLD #1 to immediately turn on and execute the run cycle per the request from the user. If the power distributor is offering a rebate on electricity, then the IELM negotiates with the power distributor to determine a time between 8:30 a.m. to 3:30 p.m. to receive the lowest cost for 1.0 kWh. The IELM then instructs VTLD #1 what time to turn on based on the negotiations with the power distributor.

The IELM 440 can also utilize the operating information to determine how to distribute load to the electrical devices during the day and night. Consider an example in which the power distributor charges a demand charge for the use of electricity. This demand charge would increase during high peak demand periods and decrease during off or low peak demand periods. The IELM can obtain and analyze historical operating information that includes electric bills from the power distributor. This information would enable the IELM to determine when in time high and low peak demand periods occur. Alternatively, the IELM could obtain this information from the power distributor. With this information, the IELM can determine when to turn on and off electrical devices during the day and night in order to save costs. For example, VTLDs can be operated during low peak demand periods, as opposed to operating these devices during high peak demand periods. This change in when the VTLD operated would result in a cost savings to the customer since the demand charge for electricity is lower during off peak demand times. The IELM can also cycle on and off electrical devices during the high peak demand periods in order to reduce the cost paid by the customer for electricity.

Consider an example in which the IELM determines that an electrical device will operate in the future for one hour at anytime between 6:00 p.m. and 12:00 a.m. The IELM determines that a high peak demand charge exists for electricity used between 4:00 p.m. and 9:00 p.m. The IELM would then instruct the electrical device to commence operation after 9:00 p.m. in order to avoid the increase demand charge for electricity.

The IELM can also utilize the operating information to more evenly distribute load throughout the day and night. Consider the example in which the IELM is located in a home of a customer (such as customer 410A in FIG. 4 being a home). Some of the electrical devices in the home would be VTLDs and could be turned on and off anytime during a future time range. The IELM can schedule these devices to turn and off in order to have a more uniform daily and nightly load demand for the home. This would reduce or eliminate spikes in power usage for the home.

Alternatively, the IELM can also utilize the operating information to distribute load throughout the day and night so more load occurs during a particular time. For example, the IELM could schedule VTLDs and other electrical devices to be on during a particular time or during a particular time range. During this time range, a larger portion of the overall load would be consumed. This time range might represent a period when electricity was less expensive. For instance, the IELM obtains the prices for electricity (e.g., demand and kWh charges) in a rate schedule. Additionally, the IELM of the customer might belong to a group of other IELMs with other customers (the IELMs of each customer reporting to a central IELM). The central IELM might instruct the IELM of each customer to use a larger portion of its load during a specific time range.

In addition to the historical operating information, other information can be used to determine a future time frame to operate the electrical device and/or purchase power in advance from the power distributor. An IALM or an IELM can monitor the weather and use forecasts of weather to determine whether to pre-purchase power for an electrical device from a power distributor. For example, a weather forecast might predict a 10 to 15 degree temperature drop within the next 24 hours due to a passing storm. The IALM or IELM would contact the power distributor and pre-purchase power for an electric heating unit since the change in temperature will cause the heating unit to turn on. Alternatively, if the weather forecasted the temperature to rise the next day, the IALM or IELM would contact the power distributor and pre-purchase power for an electric air conditioning unit since the increase in temperature will cause this unit to turn on. The IALM or IELM can receive periodic or continuous weather reports, such as receiving real-time reports through a weather gadget.

Figure 5:
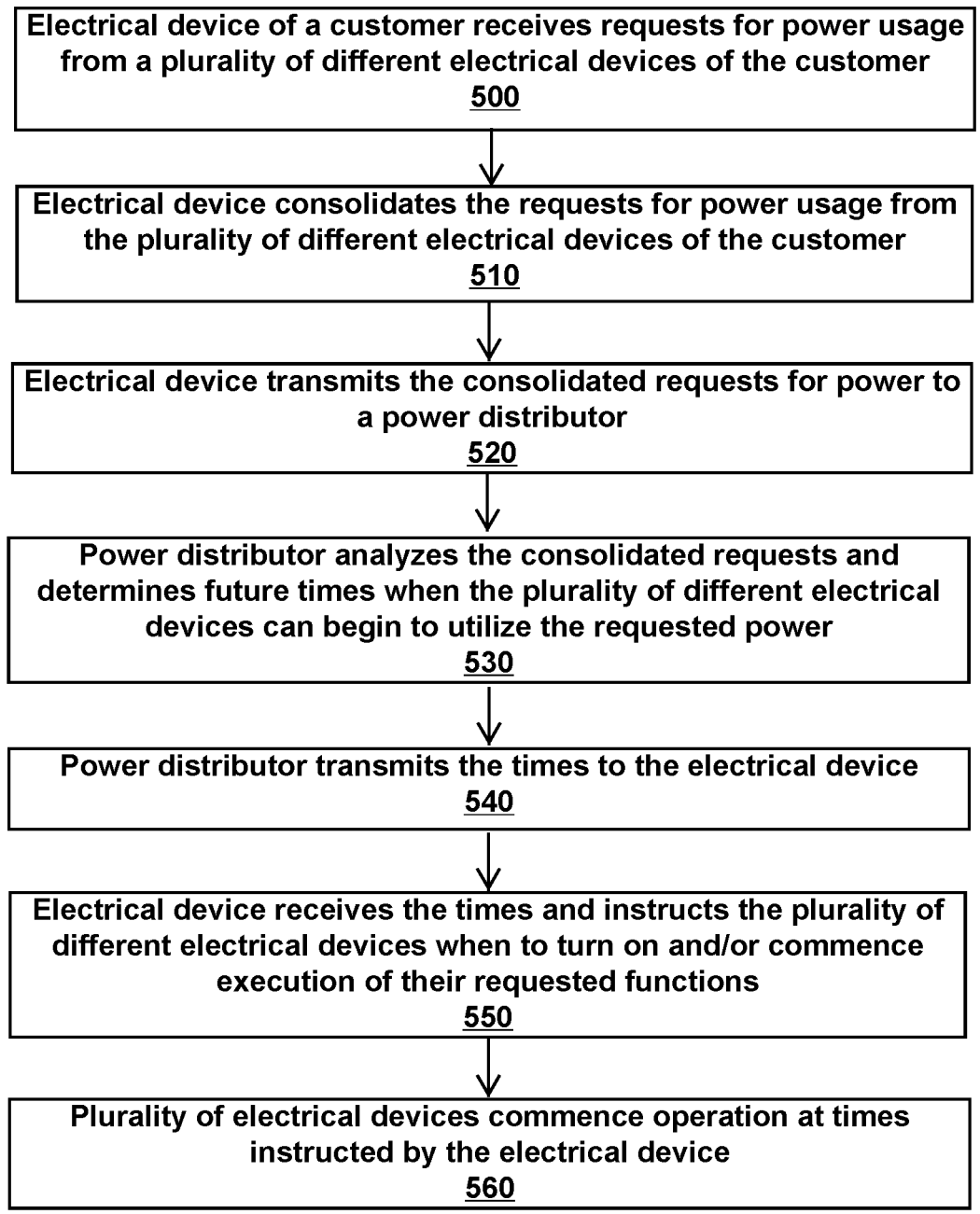
FIG. 5 is a method for managing power distribution to electrical devices in accordance with an example embodiment.

FIG. 5 is a method for managing power distribution to electrical devices in accordance with an example embodiment.

According to block 500, an electrical device of a customer receives requests for power usage from a plurality of different electrical devices of the customer. Each request can include operating information that includes one or more of an identification of the electrical device making the request, an amount of power being requested, a length of time that the electrical device requests to operate, and a time frame or time range when the requested power is to be used. For example, a residential customer has different electrical appliances and electrical devices (such as washers, dryers, dishwashers, air conditioners, heaters, etc.) that request to be turned on and/or operated during the next 24 hours. In one example embodiment, the requests are transmitted to and/or received at an IELM, such as an IELM of the customer.

According to block 510, the electrical device consolidates the requests for power usage from the plurality of different electrical devices of the customer. Consolidation can include adding information to the requests, subtracting information from the requests, summarizing the requests, and/or analyzing the requests.

According to block 520, the electrical device transmits the consolidated requests for power to a power distributor.

According to block 530, the power distributor analyzes the consolidated requests and determines future times when the plurality of different electrical devices can begin to utilize the requested power. The determination of when to instruct the electrical devices to use the requested power can be based on one or more of reducing peak power demand, more evenly distributing electrical load to customers, reducing demand charges for a customer, reducing a price of power for a customer (e.g., the price per kilowatt hour of electricity), reducing a likelihood of a brownout or power outage to customers, etc.

The future time to begin utilizing the power can be a single time, such as begin usage of the requested power in three hours at 4:20 a.m. Alternatively, the time can include multiple different times of day. For instance, if the customer requested a total of 5.2 kWh, then the future times could be provided as begin usage of 3.5 kWh at 3:00 a.m.; 1.0 kWh at 3:30 a.m.; and 0.7 kWh at 3:12 a.m. According to block 540, the power distributor transmits the times to the electrical device. For example, the time is transmitted over a network to the electrical device.

In one example embodiment, the power distributor transmits different electrical costs to purchase the requested amount of power at different times during the future time range. Consider an example in which an IELM requests 5.0 kWh of power between 1:00 a.m. and 8:00 a.m. with a usage time of 30 minutes. The power distributor might respond with a rate schedule as follows:

(1) 19 cents per kWh with a start time of 3:00 a.m.
(2) 20 cents per kWh with a start time of 5:00 a.m.
(3) 20.5 cents per kWh with a start time of 7:00 a.m.

The IELM would then select a start time and cost per kWh. For example, the IELM could select a lowest cost for the requested power and section option 1.

According to block 550, the electrical device receives times and instructs the plurality of different electrical devices when to turn on, off, and/or commence execution of their requested functions.

According to block 560, the plurality of electrical devices commences operation at times instructed by the electrical device.

By way of example, an IELM tracks and stores the operating information for different electrical devices of a customer and communicates plural requests for power to the power distributor. These requests can be consolidated (such as being added together or summarized) before being provided to the power distributor. For instance, assume a customer has several VTLDs with different power usage requests during the evening. The IELM could consolidate these individual requests together and provide them to the power distributor. For example, the IELM receives the following requests from its electrical devices:

(1) electrical device #1 requires 1000 watts for thirty minutes;
(2) electrical device #2 requires 3500 watts for one hour; and
(3) electrical device #3 requires 500 watts for one hour.

If these electrical devices were requested to operate between midnight and 6:00 a.m., then the IELM could request 4.5 kilowatt hours of electricity to be used during one hour anytime from midnight to 6:00 a.m. The power distributor would receive this single request from the IELM and instruct the IELM when to commence usage of the requested 4.5 kilowatt hours (for example, the power distributor instructs the IELM to commence usage of the requested power at 3:45 a.m.). The IELM would then instruct electrical devices #1, #2, and #3 when to turn on and/or utilize their requested power.

The IELM can also offset the amount of power needed by an amount of power that the customer generates. Consider an example in which the customer has solar panels that generate power during the requested future time period to operate the electrical devices. Based on historical data, the IELM could predict how much power will be generated by the solar panels during the future time period and then reduce the amount of power requested from the power distributor by this generated amount. For example, if the electrical device needed 1.0 kilowatt hour to run but the solar panels could generate 500 watts, then the IELM would request 500 watts of power from the power distributor instead of 1.0 kilowatt hours.

Figure 6:
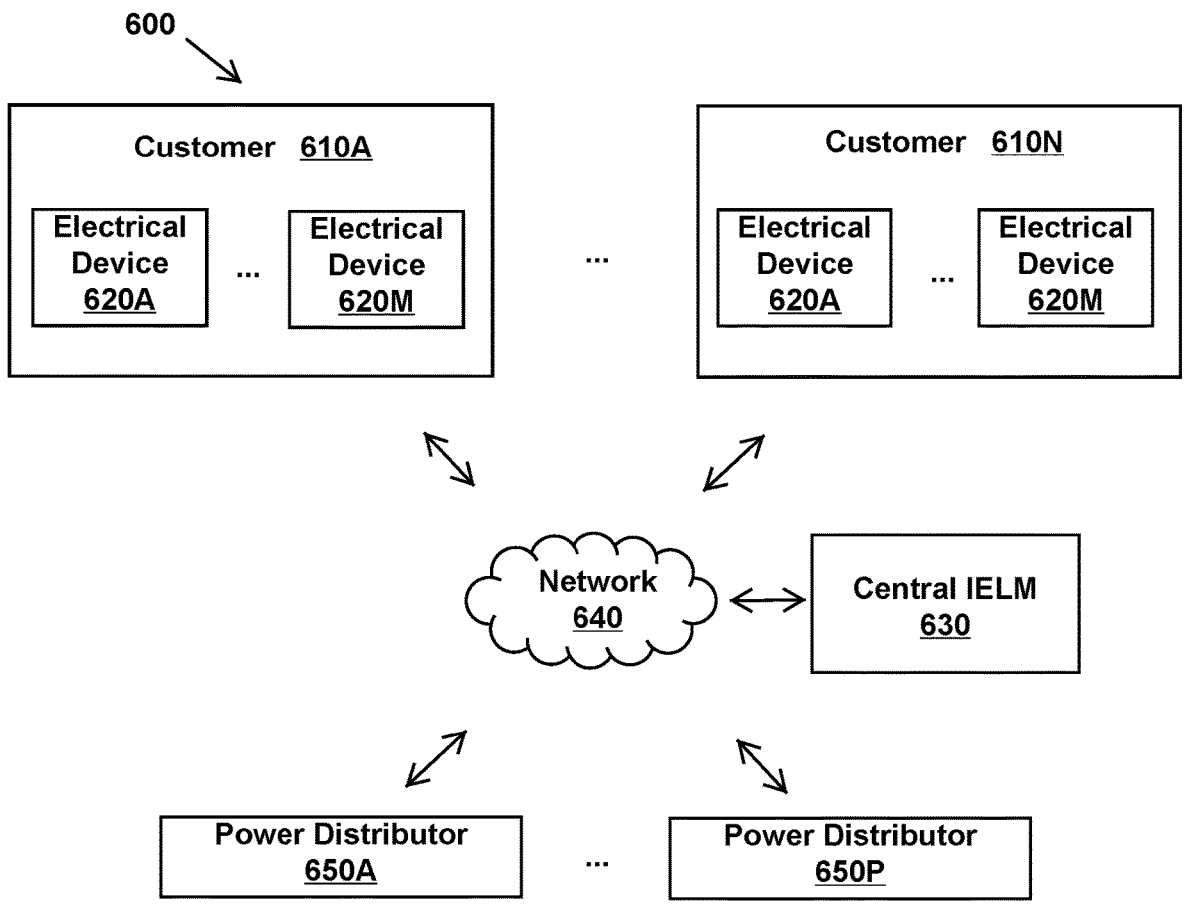
FIG. 6 is a system that forms groups to manage power distribution in accordance with an example embodiment.

FIG. 6 is a system 600 that forms groups to manage power distribution in accordance with an example embodiment. The system 600 includes a plurality of customers 610A to 610N. Each customer has a plurality of electrical devices 620A to 620M. The customers can communicate with each other and/or with a central IELM 630 through one or more networks 640. A plurality of different power distributors 650A to 650P can communicate with the customers 610A to 610N and/or with the central IELM 630 through the one or more networks 640.

Two or more of the customers 620A to 620N can form a group to purchase power from one or more of the power distributors 650A to 650P. In one example embodiment, the group collectively bids and/or requests price quotes for electrical power that will be used during a future time period. The group can negotiate for less expensive power from the power distributors 650A to 650P since the group is collectively purchasing a larger quantity of power than a single customer. Furthermore, the group is providing the power distributor with the requested purchase of power in advance of the power actually being consumed. Requests for power can be provided minutes, hours, or days before actually being used. Further, as discussed herein, requests for power can include an amount of power being requested, time ranges or time periods to use the power or portions of the power, etc.

For example, assume that a group of homes (such as homes in a residential gated community or apartments in a large apartment complex) each have a HAN and an IELM (for example, shown in FIG. 4). Each evening the IELM of every home calculates the required power usage for its VTLDs. For example, home #1 requires 3.5 kilowatt hours anytime between 12:00 am to 6:00 am; home #2 requires 5 kilowatt hours anytime between 9:00 pm to 5:00 am; home #3 requires 2 kilowatt hours anytime between 1:00 am to 9:00 am, etc. The requirements for each of these homes are transmitted to the central IELM for the entire group of homes. Thus, each home has its own IELM that reports to a central IELM for the group.

The central IELM then consolidates the power requirements and reports the consolidated power requirements over a network to the different power distributors. For example, the central IELM could report: "I need 20,000 kilowatt hours tonight between 9:00 p.m. to 6:00 a.m. Of this total kilowatt hours, 11,000 kilowatt hours will be used with execution times of 1 hour; 6,000 kilowatt hours will be used with execution times of 30 minutes, 3,000 kilowatt hours will be used with execution times of 2 hours." The power distributors can then use this information to determine how to allocate the 20,000 kilowatt hours during the time period between 9:00 p.m. to 6:00 a.m. This allocation and prices for the power are then reported back to the central IELM, which in turn then purchases the requested power from one or more of the power distributors. The central IELM can select the power distributor offering the lowest price for the requested power. The customer is thus able to obtain competing bids or costs for the requested power to be used in the future.

After selecting a power distributor, the central IELM advises each home IELM when to uses its requested power. For example, home #1 requested 3.5 kilowatt hours between 12:00 a.m. to 6:00 a.m. The central IELM could inform the IELM of home #1 "use 1.5 kilowatt hours between 1:30 a.m. to 2:00 a.m., and use 2.0 kilowatt hours between 5:00 a.m. to 6:00 a.m."

If the electrical device includes an IALM, then the electrical device itself can negotiate with the power distributor as to prices for electricity at various times, times to turn on/off, etc. For example, the dishwasher of a customer could contact several power distributors and ask: "I want 0.5 kWh between 9:00 p.m. to 6:00 a.m. What are your different prices for electricity during this time period?" Based on this information, the dishwasher can determine when to turn on and run and which power distributor will provide the power. Thus, the electrical device of the customer communicates and negotiates with the power distributor to determine a cost for power and/or a time when to use the requested power.

Alternatively, as stated herein, this request from the dishwasher could be provided to an IELM in the home of the customer (instead of being provided directly to the power distributor), and this IELM could negotiate and/or transact with the power distributor to determine when the electrical device turns on and off. As another example, a central IELM could negotiate and/or transact for multiple different customers, such as an apartment complex or housing community having a single IELM that receives power requests from each of its customers.

Example embodiments can also work with no IELM or HAN. For example, a customer purchases a freezer that turns on and off during the night. The home of the customer does not include a HAN or IELM, but does have wireless Internet or access to a network. The freezer includes an IALM that directly negotiates with the power distributor when to turn on and off to keep items frozen or keep items within a temperature range. The items in the freezer can remain within a temperature range, so the freezer has a range of time when it can turn on and off and for how long. The freezer would turn on when power was cheaper and turn off when power was more expensive. This same concept could apply, for example, to an air conditioning unit or other electrical devices.

As noted, in one example embodiment, each electrical device includes an IALM. This IALM, however, increases the cost of the electrical device. As an alternative, the IELM could monitor each electrical device, store and determine its operating information, and negotiate for or on behalf of the electrical devices. In this alternate embodiment, each electrical device would not include an IALM, but be part of the LAN or HAN. The IELM for the LAN would monitor and store over a period of time when the electrical devices of the customer turned on and off, how much electricity was consumed, calculate or determine a future time range for operating the electrical devices based on historical time usages, etc. The IELM would then designate which devices are VTLDs, negotiate on their behalf with the power distributor, and instruct the electrical devices when to turn on and off. For example, a single IELM could control a plurality of different VTLDs of a customer.

Example embodiments enable customers to bid for electrical power since the power requirements for certain electrical devices are known in advance and usage of this power can occur anytime within a time range. The exact power requirements for all of the customer's usage may not be known since the power requirements of some devices are unknown. For example, the power requirements of certain lights, TVs, microwaves, etc. in the house are not known with certainty since users turn these devices on/off for different periods of time each day and require that the device function on demand. By contrast, the power requirements for the VTLDs are known with more certainty since these electrical devices run for a known period of time, use a known amount of power, and can be run at anytime during a given time period. Bids can be presented to two or more power distributors in order secure a lower price for electricity to the customers for these VTLDs.

Consider the example in which a group of commercial customers in an industrial park form a group called Industrial Group ABC. This group includes company A, company B, and company C, each of which consumes a large portion of electrical power everyday (e.g., 15 k to 30 k kilowatt hours per day). Each company has a multitude of IALMs that report power consumption requirements to an IELM. Alternatively, a single IELM monitors the power usage of each electrical device in the company. Each electrical device would report how much power it requires during the next 24 hours (or longer period of time) and what time ranges the electrical device can start and stop. The IELM for each company A, B, and C would collect all of this information and then transmit this information to a central IELM for Industrial Group ABC.

The IELM for Industrial Group ABC can then place its power requirements on the open market for bidding between two or more power distributors. These power distributors could compete for different amounts of the total load at different times. Furthermore, the power distributors could provide different usage schemes (different prices and time periods and kilowatt hours). Prices could vary depending on demand requirements of the distribution requirements from other customers, current market conditions, etc. The central IELM for Industrial Group ABC would purchase the best available power package from one or more power distributors to meet the known power requirements reported by the IELMs for each company. The power being purchased would be for the VTLDs of the respective companies.

Companies A, B, and C would also have to purchase power for other electrical devices, such as electrical devices that were not VTLDs. These electrical devices would use random amounts of power at random times, such as lights being turned on and off at different times or lights that were required to stay on continuously. As such, companies A, B, C could get two different electrical bills or have the electrical bill divided into two separate portions. Pre-purchased power bought before usage for VTLDs, and power bought on demand. The pre-purchased power would be less expensive than power required on demand (e.g., the power to turn on a light bulb when a user enters a room). Furthermore, the power distributor could verify with an electric meter of the customer that the customer did indeed use the pre-purchased power for the VTLDs at the designated time.

Example embodiments include municipalities and other entities (such as towns, cities, villages, etc.) forming groups and buying electricity for their customers with VTLDs. These municipalities form a group of purchasers of electricity for their customers and aggregate their power usages that will be purchased from a power generator. Consider an example of a house in which electrical power usage is broadly divided into two quantities: (1) power used on a daily basis that is unknown in advance, and (2) power used on a daily basis that is fixed or known in advance and usage of this power can occur during a known time period (e.g., power used by VTLDs).

The first quantity includes power consumed by devices in which consumption is random or not known, such as light bulbs being turned on and off during the day or televisions/radios being turned on and off at random times. Other examples of this quantity would include a toaster or microwave. Although these devices may be used everyday, the time at which the devices are used can vary. Further, the devices have to function when called upon by the user (i.e., when a user wants to toast bread, the toaster cannot inform the user that toaster will not turn on for another 30 minutes because power is cheaper: The user wants to toast the bread when requested).

The second quantity includes power consumed by the VTLDs (i.e., the devices that are used at known times with a known duration and kWh usage). Further, these devices have a time range in which to operate (for example, a clothes dryer can operate for one hour at night anytime between 9:00 p.m. and 6:00 a.m.).

So, on a daily basis, the house has a fixed quantity of electrical power used by devices during a time range (e.g., VTLDs) and a variable quantity of electrical power used by all other devices. The VTLD amount is known in advance (i.e., before the power is required by the device). For each customer, a certain percentage of the total power usage can be contributed to the VTLDs, and it is this amount of power that an example embodiment negotiates and buys in advance of the power being used.

Each house (or other customer) can report its VTLD power requirements to the power distributor, such as a municipality or a group of municipalities. For each house then, the power distributor will know how much power to provide over a time range and exactly when this power will be used. If every house reported the VTLD power usage to the power distributor, then the power distributor could regulate a large percentage of power usage over a period of time each day and night. For example, if a power distributor had 5,000,000 kWh each day for VTLDs operating between 12:00 a.m. to 8:00 a.m., then the power distributor could determine when this power was used during this time frame. In other words, the power distributor could instruct the VTLDs when to turn on and run for the requested time periods and use the requested amount of power. This process would reduce or eliminate demand spikes since the power distributor could more evenly distribute load requirements of the customers. Furthermore, if the power requirements were given days or weeks in advance from the VTLDs, the power distributors would know with more certainty future power usages and use this information to make informed purchases of power on the market. Further yet, the power distributor could use this information to schedule maintenance at times with the least disruption of power to its customers. For example, a power distributor could schedule VTLDs to be off during a thirty minute time period in order to perform maintenance work on power distribution lines providing power to these VTLDs.

As noted, two or more customer can form groups. These customers can be single entities (such as residential customers) or much larger entities (such as industrial complexes). As another example, two or more municipalities can form a group, aggregate the power requirements for their respective VTLD devices, and then use this information as leverage to purchase power. The leverage exists since the group knows not only how much power but also has adjustability on when this power can be consumed.

Example embodiments include the concept that customers and/or electrical devices buy electricity or request electricity before the electricity is actually used. A customer or group of customers informs a power distributor as follows: "We will need X kilowatts hours on date Y between times Z1 to Z2. How much will you sell this amount of power and when should we consume this power during Z1 to Z2?" In response to this request, the power distributor will instruct the customer of the cost for this power and an exact time period of when to use the requested power. A potential issue arises for the power distributor if the customer ultimately does not use the requested amount of power or does not use the power during the requested time period. This situation can be resolved with a penalty for non-use and/or non-compliance with the power request. The penalty would include the customer paying a fee, such as paying a penalty or paying a higher price for the amount of requested power in the future. This penalty is fair since the power distributor relied on the requested power in determining its own purchase or power generation requirements and load distribution to its customers. Additionally, customer contracts or utility regulations can address situations where customer usage is disrupted or altered due to circumstances beyond the control of the customer or power distributor (for example, a power outage due to the weather or a malfunction of the electrical device).

Customers would be able to avoid this penalty if they could resell the requested power to another customer before the time period for usage. For example, Company A requests 10,000 kilowatt hours of power for use on March $25^{th}$ between 12:00 a.m. to 6:00 a.m. The power distributor sells the power in advance to Company A with prices and a usage schedule as follows: 2,000 kWh to be used between 12:00 a.m. to 1:30 a.m. with a price of 50 cents per kWh; 7,000 kWh to be used 3:00 a.m. to 5:00 a.m. with a price of 45 cents per kWh; and 1,000 kWh to be used between 5:00 a.m. to 6:00 a.m. with a price of 55 cents per kWh.

On March 24th, Company A realizes that it will only need 2,000 kWh between 3:00 a.m. to 5:00 a.m. As such, Company A has a surplus of previously purchased power of 5,000 kWh. If Company A does not use this power, then the power distributor will impose a penalty to Company A.

The IELM of Company A then automatically goes onto the open market and attempts to resell this power for Company A: "5,000 kWh for sale at a price of 45 cents per kWh to be used between 3:00 a.m. to 5:00 a.m." Since the price of electricity varies, the price may have risen since the original purchase. As such, Company A may be able to resell this power back to the power distributor or to another company, such as Company B or group of residential customers.

The IELM of Company A can automatically resell this power on behalf of Company A. Further, the IELM can calculate the potential penalty for not using the power versus the price on the market for reselling the power. If the penalty is greater than the difference in resell price, the IELM would sell the power. If the penalty is less than the difference in resell price, the IELM would not sell the power, but pay the penalty to the power distributor.

The process of buying and selling power for electrical devices, such as VTLDs, occurs automatically and by the IELM or the VTLD itself. The customer is provided with a daily, weekly, or monthly report of the power that was purchased. The customer could also be provided with a table, chart, or other indication as to the cost savings (i.e., show the customer what the power would have cost if it were not pre-purchased in advance by the IELM or IALM).

Example embodiments also enable dynamic adjustment of processes. Consider an example of a manufacturing plant that has numerous different industrial processes, with each process including electrical devices, such as VTLDs. These processes run each day for a given period of time and consume a given amount of power. The time at which the processes or electrical devices forming part of the processes run, however, is not crucial. Instead, they can run anytime in a specified time period. For example, every night process A (which is tooling machine) runs for 2 hours; process B (which is a furnace for molding) runs for 4 hours; process C (which is a packaging machine) runs for 5 hours. The owner of the plant runs the processes A, B, and C each night at the same time. This situation would not take advantage of a variable cost of electricity having different prices at different times of the night.

Instead of running the processes A, B, and C at the same time each night, these processes report their power requirements and duration to an IELM. Every day, the IELM contacts the power distributor and buys a block of power used by processes A, B, and C. The IELM receives a discount since the power distributor instructs the IELM when to use the power. The IELM, in turn, uses these instructions to indicate when to power on and off the processes A, B, and C during the night. Based on the cost of electricity purchased for a given day, the plant may run process A, then process B, then process C. The next night, the plant may run process B, then process A, then process C. The next night, the plant may simultaneously run processes A and B and after one hour start process C. In short, the sequence and length of time each process ran would depend on the availability of buying less expensive power. Since these processes were not required to run in any particular order or required to run at a specific time of day, the IELM was able to purchase power at a cheaper rate (e.g., when the demand charges for power were lower). The IELM would automatically start and stop the machines for processes A, B, and C at different times each night.

Figure 7:
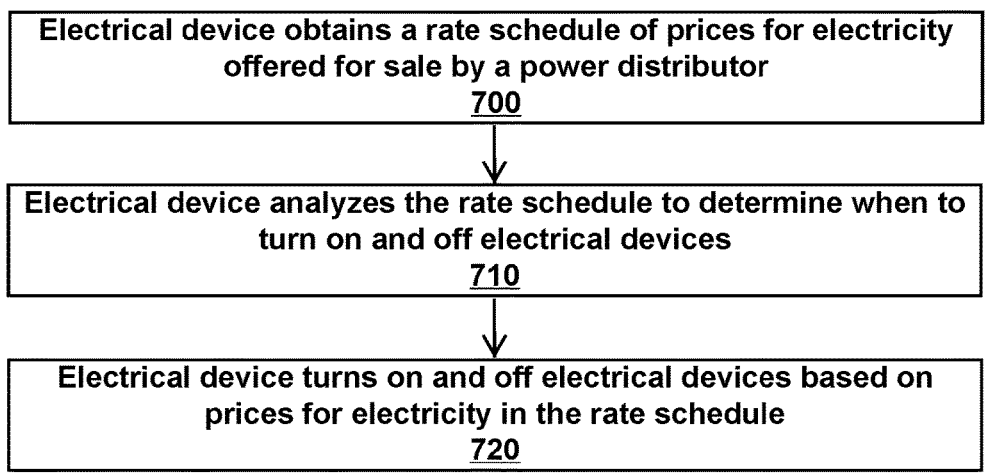
FIG. 7 is a method for managing power distribution based on a rate schedule in accordance with an example embodiment.

FIG. 7 is a method for managing power distribution based on a rate schedule in accordance with an example embodiment.

According to block 700, an electrical device obtains a rate schedule of prices for electricity offered for sale by a power distributor. This rate schedule can include different prices for different times of day and also include different demand charges and kWh charges for electricity.

According to block 710, the electrical device analyzes the rate schedule to determine when to turn electrical devices on and off. The electrical device can also use the rate schedule to determine when to schedule devices to commence operations in the future and develop a plan for when multiple different devices will turn on/off.

According to block 720, the electrical device turns on and off electrical devices based on prices for electricity in the rate schedule.

Consider an example in which an IELM of a customer receives or obtains a rate schedule for power from a power distributor. The rate schedule of the power distributor provides its customers with different prices for electricity for different times of day. These different prices could vary due to different demand charges that exist throughout the day. The IELM would use this rate schedule to determine when to schedule and/or turn on and off electrical devices. For instance, VTLDs could be scheduled to run during times with lower prices of electricity per the rate schedule. Other electrical devices could by cycled on and off during time periods with higher rates for electricity. For example, the rate schedule could indicate that the highest price for electricity will occur during the day between 12:00 p.m. and 4:00 p.m. (for instance, in a warm climate when the outdoor temperature is the hottest). In response to knowing this information, the IELM of the customer would schedule the VTLDs to be off between 12:00 p.m. and 4:00 p.m. The IELM can also cycle on and off other electrical devices that were required to run during this time period. For instance, an air conditioning unit would be turned on and off by the IELM during 12:00 p.m. and 4:00 p.m. in order to decrease power usage and demand during this time. The IELM would monitor the temperature of the room or area serviced by the air conditioning unit and turn the unit on and off in order to keep the room or area within a predetermined temperature. The IELM could be programmed to work with an air conditioning unit as follows: "During high peak demand periods (i.e., when the price of electricity is higher), maintain the room or area between 73-75 degrees Fahrenheit. During low peak demand periods (i.e., when the price of electricity is lower), maintain the room or area between 70-73 degrees Fahrenheit." The IELM would thus monitor the prices for electricity and then schedule electrical devices to be on or off and/or turn electrical devices on and off based on these prices in order to save the customer money. The IELM automatically lowers or raises the temperature of the room or area based on the price of electricity.

Example embodiments discussed herein can also include electrical devices and non-electrical devices that use natural gas. For example, gas furnaces, gas ovens, and gas stoves can include an IALM that report gas requirements to an Intelligent Gas Load Manager (IGLM). This IGLM, in turn, reports gas usage requests to a gas distributor, which in turn, provides instructions on when to turn on and utilize requested amounts of natural gas.

Method blocks discussed herein can be automated and executed by a computer or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

What is claimed is:

1. A method comprising:
receiving, from a power distributor and over a wireless network at an appliance load manager of a residential customer, a start time and a stop time to cycle on and cycle off an air conditioner of the residential customer;
simultaneously displaying, on a display of the appliance load manager and before the start time occurs, both the start time and the stop time received from the power distributor when the appliance load manager will cycle on and cycle off the air conditioner of the residential customer; and
reducing peak demand for the power distributor by cycling on and cycling off, by the appliance load manager, the air conditioner between the start time and the stop time.

2. The method of claim 1 further comprising:
displaying, on the display of the appliance load manager, an option for the residential customer to reject cycling of the air conditioner that commences on the start time.

3. The method of claim 1 further comprising:
receiving, at the appliance load manager, the start time and the stop time from the power distributor; and
transmitting, from the appliance load manager and to the power distributor, an indication that the residential customer rejects cycling of the air conditioner that commences on the start time.

4. The method of claim 1 further comprising:
displaying, on the display of the appliance load manager and between the start time and the stop time, an indication informing the residential customer that the air conditioner is being cycled on and cycled off to reduce the peak demand for the power distributor.

5. The method of claim 1 further comprising:
displaying, between the start time and the stop time, a light on the display that indicates to the residential customer that the appliance load manager is cycling the air conditioner on and off to reduce the peak demand for the power distributor.

6. The method of claim 1 further comprising:
displaying, on the display of the appliance load manager and during a time between the start time and the stop time, a message indicating to the residential customer that the air conditioner is being cycled per instructions from the power distributor.

7. The method of claim 1 further comprising:
receiving, at appliance load manager and from the power distributor, instructions when to cycle on and cycle off the air conditioner between the start time and the stop time.

8. The method of claim 1 further comprising:
cycling, by the appliance load manager and between the start time and the stop time, the air conditioner on and off to reduce the peak demand while maintaining a room of the residential customer within a temperature range that rises between the start time and the stop time.

9. The method of claim 1 further comprising:
charging, by the power distributor, the residential customer a penalty when the residential customer elects to not comply with cycling of the air conditioner between the start time and the stop time.

10. A method comprising:
receiving, at an appliance load manager of a residential customer, a time range determined by a power distributor when the appliance load manager will cycle an air conditioner;
automatically displaying, on a display of the appliance load manager before the time frame occurs, simultaneously both a start time and a stop time of the time frame to inform the residential customer that the appliance load manager will be cycling the air conditioner during the time frame; and
reducing peak demand of electricity during the time frame by cycling, by the appliance load manager, the air conditioner during the time frame.

11. The method of claim 10 further comprising:
receiving, at the appliance load manager and from the residential customer, an instruction to override control of the air conditioner during the time frame and not cycle the air condition during the time frame.

12. The method of claim 10 further comprising:
displaying, on the display of the appliance load manager and during the time frame, an indication that informs the residential customer that the appliance load manager is controlling the air conditioner according to instructions of the power distributor.

13. The method of claim 10 further comprising:
displaying, on the display of the appliance load manager, an option for the residential customer to reject control of the air conditioner during the time frame that will cause the appliance load manager not to cycle the air conditioner during the time frame according to instructions of the power distributor.

14. The method of claim 10 further comprising:
cycling, by the appliance load manager, the air conditioner on and off to reduce the peak demand of electricity during the time range while maintaining a room of the residential customer within a temperature range that rises during the time range.

15. The method of claim 10 further comprising:
displaying, on the display of the appliance load manager and during the time range, a light that indicates to the residential customer that the air conditioner is executing in an energy reduction mode in which the appliance load manager is cycling the air conditioner on and off to reduce the peak demand of electricity.

16. The method of claim 10 further comprising:
receiving, at the appliance load manager and from the residential customer, an indication to reject control of the air conditioner during the time frame.

17. An appliance load manager of a residential customer, the appliance load manager comprising:
a network interface that receives instructions with a time range determined by a power distributor that instructs the appliance load manager when to cycle an air conditioner at a future time to reduce peak demand; and
a display that automatically displays, before the time range occurs and in response to receiving the instructions, simultaneously both a start time and a stop time of the time range that notifies the residential customer when the appliance load manager will be cycling the air conditioner during the future time to reduce the peak demand,
wherein the appliance load manager cycles the air conditioner during the time range per the instructions of the power distributor to reduce the peak demand.

18. The appliance load manager of claim 17, wherein the display displays a light during the time range indicating to the residential customer that the appliance load manager is cycling the air conditioner per the instructions of the power distributor to reduce the peak demand.

19. The appliance load manager of claim 17 further comprising:
an interface that enables the residential customer an option to reject the cycling of the air conditioner during the time range.

20. The appliance load manager of claim 17, wherein the display displays, during the time range, a message indicating to the residential customer that the air conditioner is executing in an energy reduction mode in which the appliance load manager is cycling on and cycling off the air conditioner per the instructions of the power distributor.

* * * * *